March 7, 1939. E. L. BARRETT 2,149,569
REVERSIBLE ELECTRIC MOTOR
Filed Oct. 29, 1937
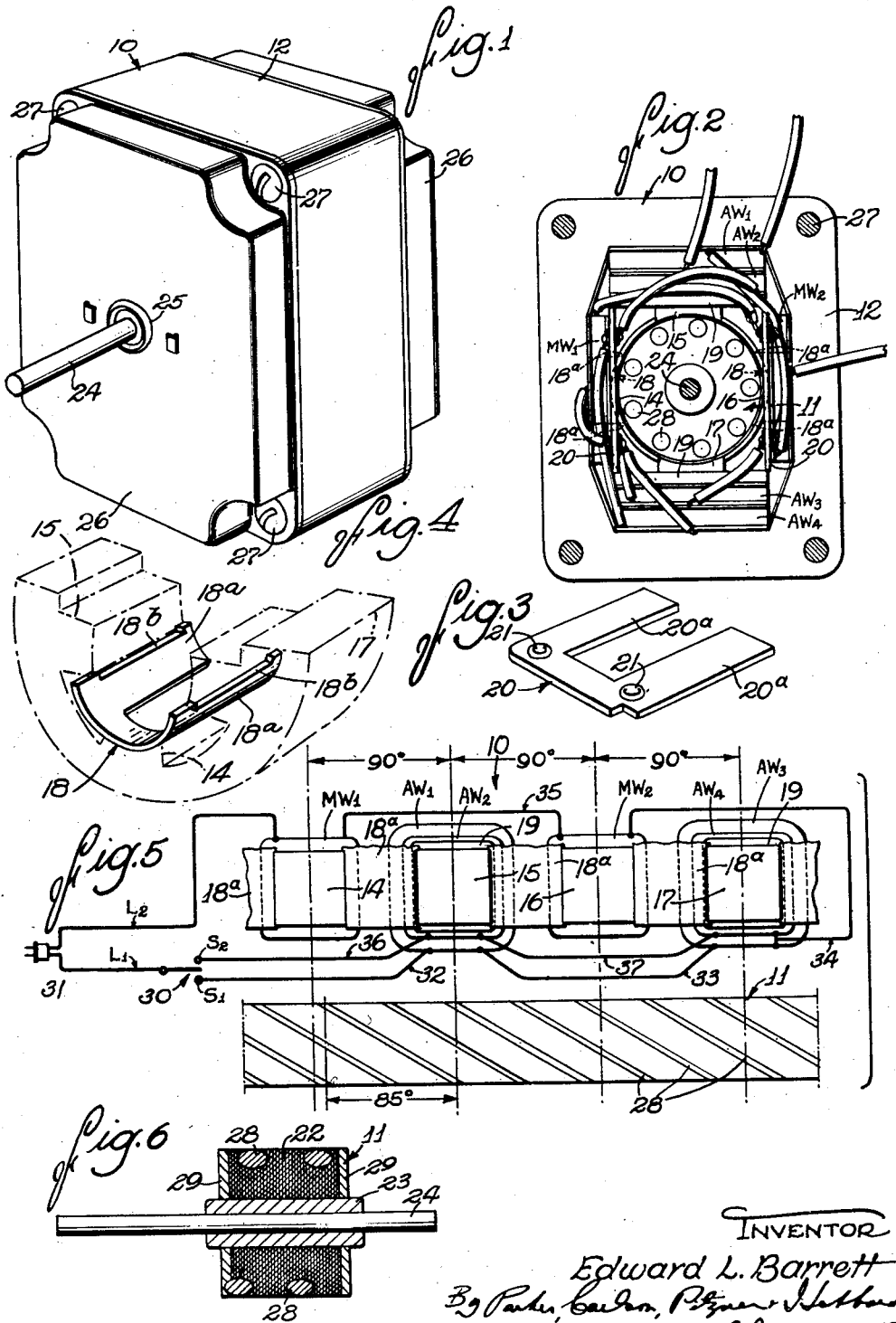
INVENTOR
Edward L. Barrett
By Parker, Carlson, Pitzner & Hubbard
ATTORNEYS Patented Mar. 7, 1939

2,149,569

UNITED STATES PATENT OFFICE 2,149,569

REVERSIBLE ELECTRIC MOTOR

Edward L. Barrett, La Grange, Ill., assignor to Utah Radio Products Company, Chicago, Ill., a corporation of Illinois Application October 29, 1937, Serial No. 171,629

8 Claims. (Cl. 172—273)

The invention relates to reversible alternating current motors of the shaded pole type.

Reversible motors of the character set forth are frequently used to actuate such instrumentalities as the tuning mechanisms of radio receivers. In such an environment, space is at a premium but on the other hand, reliable operation with strong output torque for both directions of rotation is requisite. Moreover, the control circuits must be sufficiently simple to permit the use of control switches at a remote point without complicated intervening wiring.

A two-pole motor with its shaded and unshaded pole sections distributed at equal intervals of ninety degrees about the periphery of the rotor furnishes the most compact shape of motor from the standpoint of over-all dimensions. Difficulty has heretofore been encountered, however, in obtaining a sufficiently high output torque from such a motor when it is arranged for reversible operation.

One object of the present invention is to provide a small compact reversible motor of the character set forth which furnishes a maximum output torque for either direction of rotation. The desired torque characteristics are preferably obtained at least in part by utilizing low reluctance bridges between the spaced stator pole pieces to thereby distribute the flux from the pole pieces about a maximum portion of the rotor periphery.

The invention also resides in an improved form of stator bridge construction by means of which a high degree of accuracy in dimensional relation of the parts may be readily attained even in the course of large scale production.

Further objects and advantages of the invention will become apparent as the following description proceeds and the features of novelty which characterize the invention are pointed out with particularity in the claims annexed to and forming a part of this specification.

For a better understanding of the invention, reference may be had to the accompanying drawing in which Figure 1 is a perspective view of a reversible shaded pole motor embodying the invention.

Fig. 2 is an end elevation of the motor shown in Fig. 1, the forward end shield being removed in order to illustrate the arrangement of the interiorly located parts.

Fig. 3 is an enlarged detail perspective view of one of the wedges included in the motor shown in Figs. 1 and 2.

Fig. 4 is a fragmentary perspective view showing particularly one of the flux bridges included in the motor and with the associated stator pole piece structure shown in phantom perspective.

Fig. 5 is a developed view of the cooperating rotor and stator of the motor shown in Fig. 1, the wiring connections of the various windings also being indicated.

Fig. 6 is a longitudinal sectional view of the rotor for the motor shown in Fig. 1.

Referring more particularly to the drawing, Figs. 1 and 2 illustrate one exemplary embodiment of the invention as applied to a single-phase alternating current two-pole induction motor of the shaded pole type. This motor includes as its principal elements relatively rotatable primary and secondary members illustrated in the form of a stator or field member 10 and a rotor or armature member 11. Reversible operation of this motor in either direction may be effected by a simple switch mechanism, located either adjacent the motor or at a remote point, so that the motor may be readily used for operating such instrumentalities as radio tuning mechanisms, toys, valves, and the like.

In order to minimize the over-all dimensions of the motor, the stator 10 is preferably constructed to present salient pole pieces or projections which are distributed about the entire periphery of the rotor. With such an arrangement it is desirable to utilize small flat preformed coils or energizing windings surrounding the individual pole pieces as shown in Fig. 2, for example. In such case, however, the pole pieces must be relatively narrow in order that sufficient clearance will be had therebetween to permit the insertion of the windings which encircle them. Although a very compact motor is had with such an arrangement, the relatively wide spacing of the shaded and unshaded pole pieces seriously interferes with the proper operation of the motor. Consequently, in accordance with one aspect of the invention herein contemplated, various novel features have been embodied in the motor structure in order to insure a high starting torque and high torque output during normal operation which features, at the same time, permit ready reversibility of the motor.

In the exemplary embodiment of the invention the stator 10 is provided with a magnetizable core 12 made up of a stack of laminations of silicon steel or the like. These laminations are generally rectangular in shape and are fashioned to provide a centrally located rotor recess bordered by spaced inwardly extending annularly disposed pole pieces or salient pole projections 14—17.

The exposed faces of the pole pieces are arcuate in shape and conform closely to the contour of the cylindrical rotor 11. In order to attain a maximum distribution of flux about the periphery of the rotor and in such manner as to insure efficient operation for either direction of rotation, bridges 18 (Figs. 2 and 4) fashioned as stampings from low reluctance metal are press fitted between the adjacent lateral sides of the outer ends of the pole pieces. The faces of the bridges are also arcuate and thus form smooth continuations of the arcuate pole piece faces. As best shown in Fig. 4, the bridges designated by the numeral 18 are preferably generally U-shaped with legs 18$^a$ dimensioned to fit between adjacent pole pieces. In the construction illustrated, two bridge members 18 are utilized and are disposed to embrace or straddle the unshaded pole pieces 14 and 16 (Fig. 4). With such a bridge structure, the members 18 are press fitted on the pole pieces which they embrace and the inner faces of the legs 18$^a$ are thus positioned with great nicety with respect to the periphery of the rotor 11. Thus, even when such motors are manufactured in large quantities, the exact curvature of the bridge faces is determined by the dies used in stamping or forming them and the rigid mounting for the bridges insures a proper clearance between the bridge faces and the rotor. Preferably, the outer edges of the legs 18$^a$ are notched as indicated at 18$^b$ in order to minimize the area of contact between the bridges and the sides of the shaded pole pieces against which they are pressed. As a result, the bridges serve principally to distribute the unshaded flux about the periphery of the rotor when constructed as shown in the exemplary embodiment.

Upon reference to Fig. 2 it will be seen that the bridges 18 are small in cross-sectional area as compared to the pole pieces. Consequently, there is a concentration of magnetic flux at the pole faces despite the presence of the bridges but nevertheless the bridges serve to distribute the flux sufficiently over the rotor surface to give good induction motor action. The relation of the dimensions of the various cooperating parts is of course important, especially in such small motors as are herein contemplated, in obtaining the necessary distribution of magnetic flux for maximum power output and good starting torque for reversible operation. It has been found that in such a reversible motor as that shown, good operating characteristics are had with a rotor 0.755 inch in diameter and having 0.011 inch clearance from the pole pieces, when the bridges are made of cold rolled steel 0.032 inch in thickness and the pole pieces are 0.346 inch in width circumferentially of the rotor.

Exciting windings are provided for setting up a rotating magnetic field which progresses in one direction or the other about the rotor recess, in accordance with selected winding connections, so that rotation of the rotor is induced in one direction or the other as selected for the desired reversible operation. Two magnetic pole units are formed by the four pole pieces 14—17, two adjacent pole pieces making up the respective sections of each unit. One section of each unit is shaded by any suitable means as, for example, by permanently short-circuited heavy copper rings 19 encircling the pole pieces 15 and 17. As is well understood in the art, the shading rings cause the flux in their encircled pole pieces to lag in time phase behind that of the unshaded pole pieces and consequently, a magnetic field is set up which in effect rotates about the rotor recess, thus inducing rotation of the rotor. Reversible rotation of the rotor in one direction or the other may be had by energizing the unshaded pole pieces to have the same instantaneous polarity as the shaded pole pieces on one side or the other thereof. Thus, for one direction of rotation the unshaded pole pieces 14 and 16 are paired respectively with the shaded pole pieces 15 and 17 while for the opposite direction of rotation the unshaded pole pieces 14 and 16 are paired respectively with the shaded pole pieces 17 and 15.

In order to obtain the desired alternative energization of the pole pieces main energizing windings MW$_1$ and MW$_2$ encircle the unshaded pole pieces 14 and 16, respectively while two pairs of auxiliary energizing windings AW$_1$—AW$_2$ and AW$_3$—AW$_4$ encircle the shaded pole pieces 15 and 17, respectively. The auxiliary windings are arranged to energize their respective pole pieces alternatively. In order that they may effect a magnetization of opposite polarity the auxiliary windings AW$_1$ and AW$_2$ are oppositely wound with respect to each other as are the windings AW$_3$ and AW$_4$. It will be understood that by the term "oppositely wound" as used in the specification and claims appended hereto, reference is had to any arrangement in which the windings serve to produce a magnetic flux of opposite instantaneous polarity; that is, the coils may be actually wound in opposite directions about the pole pieces or the windings may be in the same direction but the end connections reversed, the net effect in either case being the same.

All of the energizing windings, both main and auxiliary, are preferably fashioned as interchangeable preformed coils. They may be made on an ordinary winding machine, being wound on kraft paper or the like, and then slipped over the straight sided pole pieces prior to the insertion of the bridges 18 in the assembly of the motor. A series of wedges 20 (Figs. 2 and 3) made of fiber or other stiff insulating material serve to hold the bridges firmly in position on the pole pieces. Upon reference to Fig. 2, it will be seen that these wedges are flat and generally U-shaped. They are arranged with their legs 20$^a$ on opposite sides of the pole pieces 14 and 16 and overlying the center portions of the bridges 18. The adjacent inner face of the motor end shield bears against the outer edges of the wedges, thus forcing them down against the bridges. Eyelets 21 (Fig. 3) in the ends of the wedges 20 serve to hold the coil end connections in place. This general wedge construction for holding the windings in place and forming the end connections therefor forms no part of my present invention, but is claimed in my copending application Serial No. 169,095, filed October 15, 1937.

The rotor 11 is of the squirrel cage type. As best shown in Fig. 6, it embodies a cylindrical laminated core 22 made of magnetizable material such as silicon steel. This core is press fitted on a bushing 23 made of brass or the like which is in turn pressed on a rotor shaft 24. This shaft is journaled in suitable self-alining bearings 25 (Fig. 1) which support the rotor within the rotor recess of the stator. The bearings 25 are carried by cup-shaped pressed metal end shields 26 secured to the opposite sides of the stator core 12 by through bolts 27.

A squirrel cage winding for the rotor 11 is formed by conductors or rotor bars 28 (Figs. 2 and 6) permanently short-circuited at their opposite ends by heavy copper disks 29. The rotor bars 28, which are also preferably made of copper, are embedded in suitable recesses in the surface of the rotor core 22. Although the bars 28 extend generally axially of the rotor core, they are given a decided skew as best shown in the developed view thereof in Fig. 5. It has been found that the amount of skew of these bars is an important factor in obtaining best operation of the motor, especially in the case of a reversible two-pole motor with the pole sections displaced at intervals of ninety degrees from each other about the rotor as in the construction shown. With such an arrangement it is desirable that the rotor skew approximate the angular displacement of the axes of the pole pieces. Thus, in the construction shown, with the pole piece axes distributed at intervals of ninety degrees about the rotor recess, good results have been obtained with a rotor skew of eighty-five degrees.

Upon reference to Fig. 5, it will be seen that the motor may be started in either direction or stopped under the control of a single-pole double-throw switch 30 having contacts $S_1$ and $S_2$. The motor is connected to a suitable source of alternating current such as an electric lighting system through the medium of a connection plug 31 and supply lines $L_1$ and $L_2$. Thus, upon closure of the switch contact $S_1$ the motor is energized for rotation in one direction through a circuit $L_1$—$S_1$—32—$AW_1$—33—$AW_3$—
$\quad\quad\quad\quad\quad\quad$ 34—$MW_2$—35—$MW_1$—$L_2$.

In such case the auxiliary windings $AW_1$ and $AW_3$ may be arranged to produce a magnetic flux of the same polarity as the main windings $MW_1$ and $MW_2$, respectively, although lagging behind the same in time phase due to the shading rings 19. In such case the oppositely wound auxiliary windings $AW_2$ and $AW_4$ are arranged to produce a magnetic flux of the same polarity as the main windings on the opposite sides thereof, namely, $MW_2$ and $MW_1$, respectively. Thus, upon closure of the switch contact $S_2$ the motor is energized for rotation in the opposite direction by a circuit $L_1$—$S_2$—36—$AW_2$—37—$AW_4$—
$\quad\quad\quad\quad\quad\quad$ 34—$MW_2$—35—$MW_1$—$L_2$.

The motor may be stopped at will by moving the switch 30 to its open-circuit position shown in Fig. 5.

Although a particular embodiment of the invention has been shown and described in some detail for purposes of illustration, there is no intention to thereby limit the invention to such embodiment but, on the other hand, the append claims are intended to cover all modifications within the spirit and scope of the invention.

I claim as my invention:

1. A reversible alternating current motor of the shaded pole type comprising, in combination, a stator core comprising a stack of laminations of magnetizable material, said laminations being apertured within their marginal edges to define a rotor recess bordered by a plurality of spaced annularly disposed inwardly projecting integral pole pieces of generally rectangular shape, a rotor mounted in said recess for induced rotation and including a cylindrical magnetizable core having a squirrel cage winding thereon, the faces of said pole pieces formed integrally from said laminations being arcuate in shape conforming to the contour of said rotor and being exposed thereto, U-shaped bridge members fashioned from portions of highly magnetically permeable sheet metal embracing alternate ones of said pole pieces and press fitted thereon with the legs of said bridge members extending substantially between adjacent pole pieces, the faces of the legs of said bridge members being arcuate in shape and conforming to the contour of said rotor, means for permanently shading some of said pole pieces with at least one unshaded pole piece intervening between consecutive shaded pole pieces, and means including a plurality of selectively available energizing windings encircling said pole pieces for energizing the same in alternate groups, each group comprising a shaded pole piece and an unshaded pole piece on one side or the other thereof depending upon the direction of rotation selected.

2. In a motor of the character described, a stator unit having a rotor recess therein and including a plurality of salient pole pieces disposed annularly about said recess, a cylindrical rotor in said recess, shading rings on alternate ones of said pole pieces, and U-shaped bridge members fashioned from portions of highly magnetically permeable sheet metal, said bridge members being disposed in straddling relation over the unshaded pole pieces with the legs thereof extending generally axially of the rotor and press fitted between adjacent shaded and unshaded pole pieces, said bridge member legs being notched out on the outer edges thereof to minimize the area of contact between said legs and the shaded pole pieces.

3. In a motor of the character described, a stator unit having a rotor recess therein and including a plurality of salient pole pieces disposed annularly about said recess, a cylindrical rotor in said recess, the end faces of said pole pieces being arcuate in shape and conforming to the contour of said rotor, and a U-shaped bridge member fashioned from a portion of highly magnetically permeable sheet metal, said bridge member being press fitted in straddling relation over one of said pole pieces and extending generally axially of said rotor, the legs of said bridge member being formed with arcuate shaped faces conforming to the contour of said rotor and constituting smooth continuations of the face of said one pole piece.

4. In a motor of the character described, a stator unit comprising a plurality of salient pole pieces arranged in spaced relation, and a U-shaped bridge member fashioned from a portion of highly magnetically permeable sheet metal, said bridge member being press fitted in straddling relation over one of said pole pieces and disposed with the legs thereof extending in close proximity to the side faces of adjacent ones of said pole pieces.

5. A two-pole reversible alternating current motor comprising, in combination, a magnetizable field core defining a rotor recess bordered by four spaced annularly disposed inwardly extending pole projections arranged at intervals of substantially ninety degrees about the recess, a rotor mounted in said recess for induced rotation and including a cylindrical magnetizable core having a squirrel cage winding thereon, permanently short-circuited shading rings surrounding alternate ones of said projections, individual main energizing windings surrounding each of the unshaded pole projections, a pair of oppositely wound individual energizing windings surrounding each of the shaded pole projections alternatively energizable to produce magnetic poles therein of the same polarity as the magnetic poles produced in the next adjacent unshaded projection on one side or the other thereof but displaced in time phase therefrom to induce rotation of said rotor in a corresponding selected direction, and bridges extending between adjacent side portions of said pole pieces to form relatively low reluctance flux paths extending laterally from said pole pieces closely adjacent the periphery of said rotor.

6. A reversible alternating current motor comprising, in combination, a stator provided with a plurality of magnetizable annularly disposed spaced pole pieces defining a rotor recess, a rotor mounted in said recess for induced rotation and including a cylindrical magnetizable core having a squirrel cage winding thereon, permanently short-circuited shading rings surrounding alternate ones of said pole pieces, individual main energizing windings surrounding each of the unshaded pole pieces, a pair of oppositely wound auxiliary energizing windings surrounding each of the shaded pole projections alternatively energizable to produce a magnetic pole therein of the same polarity as the magnetic pole produced in the next adjacent unshaded projection on one side or the other thereof but displaced in time phase therefrom to induce rotation of said rotor in a corresponding selected direction, and bridges extending between adjacent side portions of said pole pieces to form relatively low reluctance flux paths extending laterally from both sides of each of said pole pieces closely adjacent the periphery of said rotor.

7. In a motor of the character described, a tri-sectional stator pole unit comprising permanently shaded and unshaded salient pole pieces arranged in alternating relation, each of said pole pieces embodying a substantially unitary body of magnetizable material free of transverse air gaps or the like, means for energizing said pole pieces in pairs, each pair comprising a shaded and unshaded pole piece, and means forming low reluctance flux paths extending laterally from the face of the central one of said pole pieces into close proximity with the faces of the pole pieces on both opposite sides thereof.

8. A reversible alternating current motor comprising, in combination, a stator provided with a plurality of magnetizable annularly disposed spaced pole pieces defining a rotor recess, each of said pole pieces embodying a substantially unitary body of magnetizable material free of transverse air gaps or the like and with each spaced from the others a substantial distance circumferentially of the rotor recess, a rotor mounted in said recess for induced rotation and including a cylindrical magnetizable core having a squirrel cage winding thereon, single energizing windings surrounding alternate ones of said pole pieces, a pair of oppositely wound energizing windings surrounding each of the remaining projections alternatively energizable to produce a magnetic pole therein of the same polarity as the magnetic pole produced in the next adjacent projection on one side or the other thereof, permanently short-circuited shading rings surrounding alternate ones of said pole pieces, and bridges extending between adjacent side portions of said pole pieces to form relatively low reluctance flux paths extending laterally from both sides of each of said pole pieces closely adjacent the periphery of said motor.

EDWARD L. BARRETT.